(12) United States Patent
Park et al.

(10) Patent No.: US 12,525,166 B2
(45) Date of Patent: Jan. 13, 2026

(54) DISPLAY PANEL AND DISPLAY DEVICE INCLUDING THE SAME

(71) Applicant: LG DISPLAY CO., LTD., Seoul (KR)

(72) Inventors: Yangsu Park, Goyang-si (KR); Chanyong Jung, Pohang-si (KR); Taewook Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/790,972

(22) Filed: Jul. 31, 2024

(65) Prior Publication Data

US 2024/0395187 A1 Nov. 28, 2024

Related U.S. Application Data

(62) Division of application No. 17/941,529, filed on Sep. 9, 2022, now Pat. No. 12,080,219.

(30) Foreign Application Priority Data

Sep. 17, 2021 (KR) .................. 10-2021-0124564

(51) Int. Cl.
*G09G 3/20* (2006.01)

(52) U.S. Cl.
CPC ... *G09G 3/2092* (2013.01); *G09G 2300/0426* (2013.01); *G09G 2330/04* (2013.01); *G09G 2330/08* (2013.01)

(58) Field of Classification Search
CPC ......... G09G 3/2092; G09G 2300/0426; G09G 2330/04; G09G 2330/08; G09G 2330/025; G09G 3/006; G09G 2300/023; G09G 2300/026
See application file for complete search history.

(56) References Cited

U.S. PATENT DOCUMENTS

2008/0204618 A1* 8/2008 Jung .................. G02F 1/13452
 349/40
2011/0310342 A1* 12/2011 Kim .................. G02F 1/13452
 349/149

(Continued)

FOREIGN PATENT DOCUMENTS

| CN | 101145567 A | 3/2008 |
| CN | 105842938 A | 8/2016 |
| KR | 2012-0073879 A | 7/2012 |

(Continued)

OTHER PUBLICATIONS

Office Action in Chinese Appln. No. 202211121130.1, mailed on May 20, 2025, 14 pages (with English translation).

(Continued)

*Primary Examiner* — Mariam Qureshi
(74) *Attorney, Agent, or Firm* — Fish & Richardson P.C.

(57) ABSTRACT

The present disclosure provides a display panel and a display device including the same. In the display panel, panel defects caused by static electricity induced due to an MPS line remaining on the panel after a cutting process in a cell array process of a display device is removed, the remaining MPS line is electrically connected to an ESD circuit through a discharge line, thus the static electricity induced by the MPS line remaining in the panel flows to the ESD circuit through the discharge line, thereby suppressing the panel defects caused by the MPS line.

10 Claims, 13 Drawing Sheets

(56) References Cited

U.S. PATENT DOCUMENTS

2014/0185169 A1\* 7/2014 Jung .................... G09G 3/3685
361/56
2019/0304386 A1\* 10/2019 Kim ........................ G09G 3/30

FOREIGN PATENT DOCUMENTS

| KR | 20120096256 A | 8/2012 |
| KR | 20160083205 A | 7/2016 |
| KR | 20170068881 A | 6/2017 |
| KR | 10-2211928 B1 | 2/2021 |

OTHER PUBLICATIONS

Office Action in Korean Appln. No. 10-2021-0124564, mailed on Jan. 28, 2025, 11 pages (with English translation).

\* cited by examiner

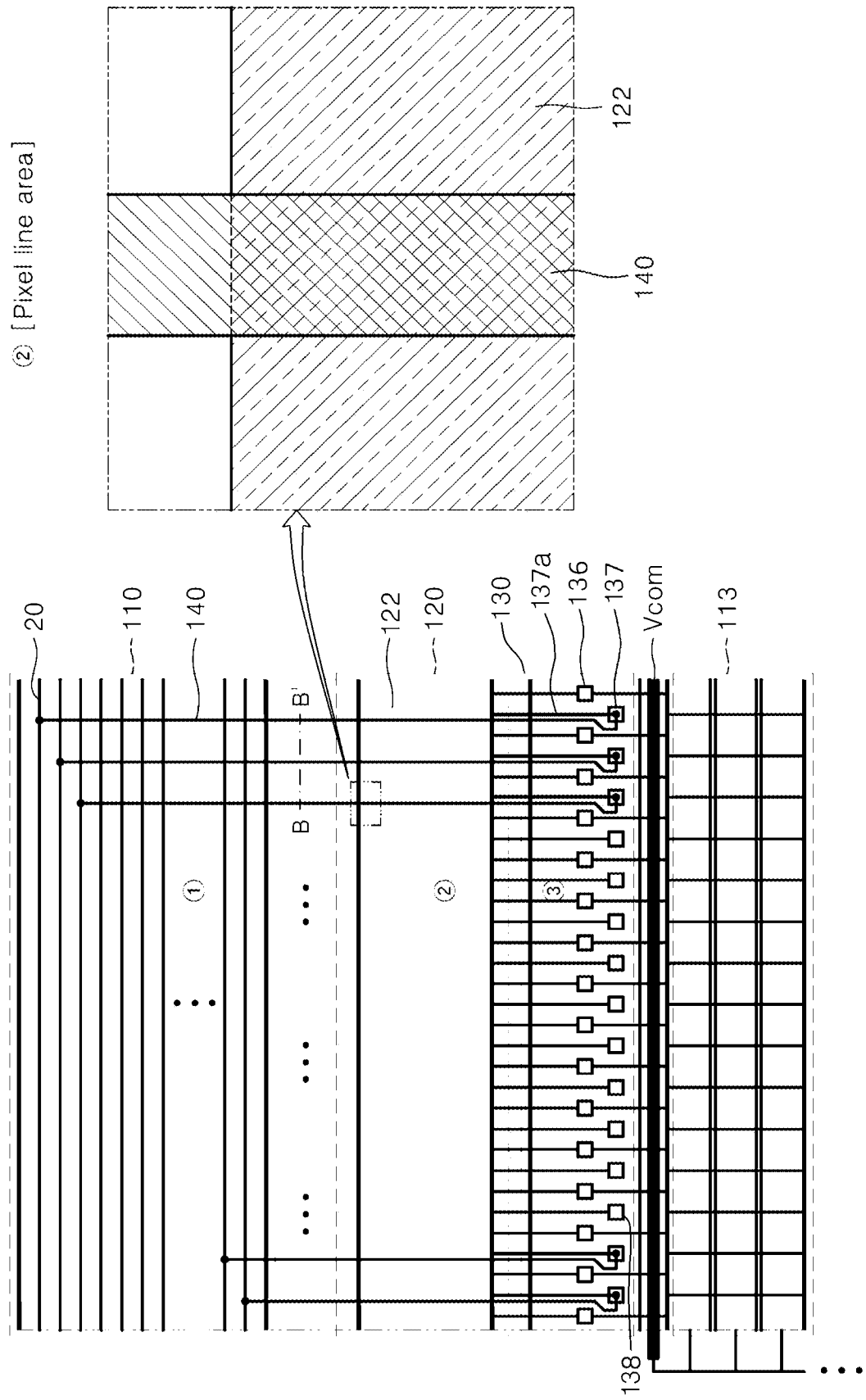

DISPLAY PANEL AND DISPLAY DEVICE INCLUDING THE SAME

CROSS-REFERENCE TO RELATED APPLICATIONS

This application is a divisional of U.S. patent application Ser. No. 17/941,529, filed on Sep. 9, 2022, which claims the priority of the Korean Patent Application No. 10-2021-0124564 filed on Sep. 17, 2021, which are hereby incorporated by reference in their entirety.

FIELD OF THE DISCLOSURE

The present disclosure relates to a display panel that a panel defect caused by static electricity induced by a multi-pattern search (MPS) line remaining on the display panel after a cutting process of a mother glass in a manufacturing process of a display device may be removed, and the display device including the same.

DESCRIPTION OF THE BACKGROUND

A typical liquid crystal display device displays an image by controlling light transmittance of liquid crystals having dielectric anisotropy using an electric field. For this purpose, the liquid crystal display device includes a liquid crystal display panel in which pixel areas are arranged in a matrix form and a driver circuit for driving the liquid crystal display panel.

In the liquid crystal display panel, first and second substrates are bonded with each other while a certain space therebetween is maintained, and a liquid crystal layer is formed between the space maintained by the two substrates. To drive the liquid crystal layer on a pixel basis, a plurality of gate lines and a plurality of data lines are disposed on the first substrate and intersect each other to define the pixel areas at the intersections therebetween. A pixel electrode is formed in each pixel area, and a thin-film transistor is formed at an area where each gate line and each data line intersect each other. The thin-film transistor is turned on based on a scan signal of each gate line such that a data signal of the data line is applied to each pixel electrode. Thus, a thin-film transistor array substrate is obtained.

Further, on the second substrate, a black matrix layer for blocking light in an area except for the pixel area, a color filter layer formed in each pixel area to render color, and a common electrode corresponding to the pixel electrode and generating an electric field for driving the liquid crystal layer are disposed. Thus, a color filter array substrate is obtained.

A driver circuit includes a gate driver for driving the gate lines, a data driver for driving the data lines, and a timing controller that supplies control signals and data signals for controlling the gate driver and the data driver.

The gate driver has a shift register to sequentially output a scan pulse to the gate lines. The shift register is composed of a plurality of stages connected to each other in a dependent manner. The plurality of stages sequentially outputting scan pulses to sequentially scan the gate lines of the liquid crystal panel. Specifically, a first stage among the plurality of stages receives a start signal from the timing controller as a trigger signal, and the remaining stages except the first stage receive am output signal from a previous stage as a trigger signal. In addition, each of the plurality of stages receives at least one clock pulse from among a plurality of clock pulses having sequential phase differences. Accordingly, the first stage to the last stage sequentially output the scan pulses.

Regarding use of the gate driver, a separate gate driver integrated circuit (IC) in which the shift register of the gate driver is embedded is manufactured and then the gate driver IC is connected a gate line pad of the liquid crystal display panel using a mounting process.

The above-described liquid crystal display device may be generally manufactured using a cell array process, a bonding process, a module process, and the like.

The cell array process defines a plurality of panel areas on a first parent substrate and forms a thin-film transistor array having a gate line, a data line, a thin-film transistor and a pixel electrode in each panel area. The cell array process defines a plurality of panel areas on a second parent substrate and forms a color filter array having a black matrix layer, a color filter layer, and a common electrode in each panel area.

The bonding process forms a sealant on an edge portion of each panel area of the first or second parent substrate and drops liquid crystal, aligns the two parent substrates with each other and bonds the substrates with each other, and cuts the attached substrate on a panel area basis, and performs auto-probe inspection.

The module process refers to a process of attaching a driver IC to a unit panel and coupling a backlight thereto.

After the cell array process is completed as described above, and before the bonding process, disconnection and short circuit defects of each signal line are checked through MPS (Multi-Pattern Search) lines. When the defect is detected, a repair process may be additionally performed.

As described above, for the MPS inspection for checking the disconnection and short circuit defects of each signal line of the thin-film transistor array, a MPS line for inspecting the defects are formed during the cell array process, and these MPS lines are removed during the cutting process.

In this regard, in the cell array process for manufacturing a 23.8 inch panel model, a spacing between panel areas on the parent substrate where the multiple panel areas are defined is very small, compared to other panel models. The MPS lines for checking the disconnection and short circuit defects of each signal line may be formed in the spacing.

In the bonding process, to maximize efficiency of a panel glass, a panel to panel just cut to cut a line between two panel areas adjacent to each other in a vertical direction is performed. After the just cut, the MPS lines remain on a top face of each panel.

In this regard, when static electricity is generated on the panel after the just cut, static electricity is induced by the remaining MPS lines, and the induced static electricity is floating in the MPS lines and is applied to a common voltage (Vcom) line.

At this time, the Vcom line is connected to the pixels. Thus, the applied static electricity is applied to the pixels such that voltage distortion may occur, which causes temporary staining on the screen.

The above information disclosed in this Background section is only for enhancement of understanding of the background of the described technology and therefore it may contain information that does not form prior art that is already known to a person of ordinary skill in the art.

SUMMARY

Accordingly, the present disclosure is directed to a display panel and a display device including the same that substantially obviate one or more of problems due to limitations and disadvantages described above.

More specifically, the present disclosure is to provide a display panel in which the pixel defect caused by the static electricity induced by the MPS lines remaining on the display panel after the cutting process of the mother glass in the manufacturing process of the display device is removed, and a display device including the same.

The present disclosure is not limited to the above-mentioned and other advantages of the present disclosure that are not mentioned may be understood based on following descriptions, and may be more clearly understood based on aspects of the present disclosure. Further, it will be easily understood that the purposes and advantages of the present disclosure may be realized using means shown in the claims and combinations thereof.

In an aspect of the present disclosure, a display panel may be one panel obtained by just-cutting a parent panel (mother glass) having a plurality of panel areas arranged and adjacent to each other in a scribe process, the display panel includes a base substrate including a display area and a non-display area; and static electricity discharge part, the static electricity discharge part include an MPS (multi-pattern search) area disposed in an upper area of the non-display area, wherein at least one MPS line is disposed in the MPS area; an ESD area in which at least one ESD (Electrostatic Discharge) circuit is disposed, wherein the ESD circuit discharges static electricity generated in the display area and the non-display area; and at least one discharge line for connecting the at least one MPS line to the at least one ESD circuit, respectively. Therefore, the display panel may allow static electricity generated in the non-display area to flow from the MPS lines to the ESD circuit through the discharge lines.

Further, a display device according to an aspect of the present disclosure may be provided. The display panel may be one panel obtained by just-cutting a parent panel (mother glass) having a plurality of panel areas arranged and adjacent to each other in a scribe process, the display panel comprising: a base substrate including a display area and a non-display area disposed out of the display area, wherein in the display area, a pixel is defined in each of intersections between a plurality of gates and a plurality of data lines; a GIP (gate in panel) for supplying a scan signal to the plurality of gate lines; a data driver for supplying a data signal to the plurality of data lines; and static electricity discharge means. The static electricity discharge part include: an MPS (multi-pattern search) area overlapping an upper area of the non-display area, wherein at least one MPS line is disposed in the MPS area; an ESD area in which at least one ESD (Electrostatic Discharge) circuit is disposed, wherein the ESD circuit discharges static electricity generated in the display area and the non-display area; a ground area between the MPS area and the ESD area, wherein a ground electrode is disposed in the ground area; and at least one discharge line for connecting the at least one MPS line to the at least one ESD circuit, respectively. Thus, the static electricity generated in the non-display area may flow from the MPS lines to the ESD circuits through the discharge lines, thereby preventing temporary staining from occurring on a screen.

According to an aspect of the present disclosure, as the MPS lines remaining on the display panel are respectively connected to the ESD circuits through the discharge lines, static electricity generated in the non-display area and flowing into the MPS lines may flow into the ESD circuits via the discharge lines, thereby preventing voltage distortion caused by the MPS lines.

Further, according to the present disclosure, since it is not necessary to attach a conductive tape to the panel to remove the ESD defects caused by the MPS lines, quality of the display panel may be improved.

Further, according to the present disclosure, even when static electricity flows into the display panel due to the MPS lines remaining on the display panel, the phenomenon in which stains occur on the screen may be prevented. Therefore, the quality of the display panel may be improved.

The effect of the present disclosure is not limited to the above-mentioned effects, and another effect as not mentioned will be clearly understood by those skilled in the art from following descriptions.

In addition to the above-described effects, specific effects of the present disclosure will be described together while describing specific details for carrying out the disclosure below.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIG. 7A is a diagram showing a discharge line in a ground area of a static electricity discharge part according to an aspect of the present disclosure;

DETAILED DESCRIPTION

Figure 1:
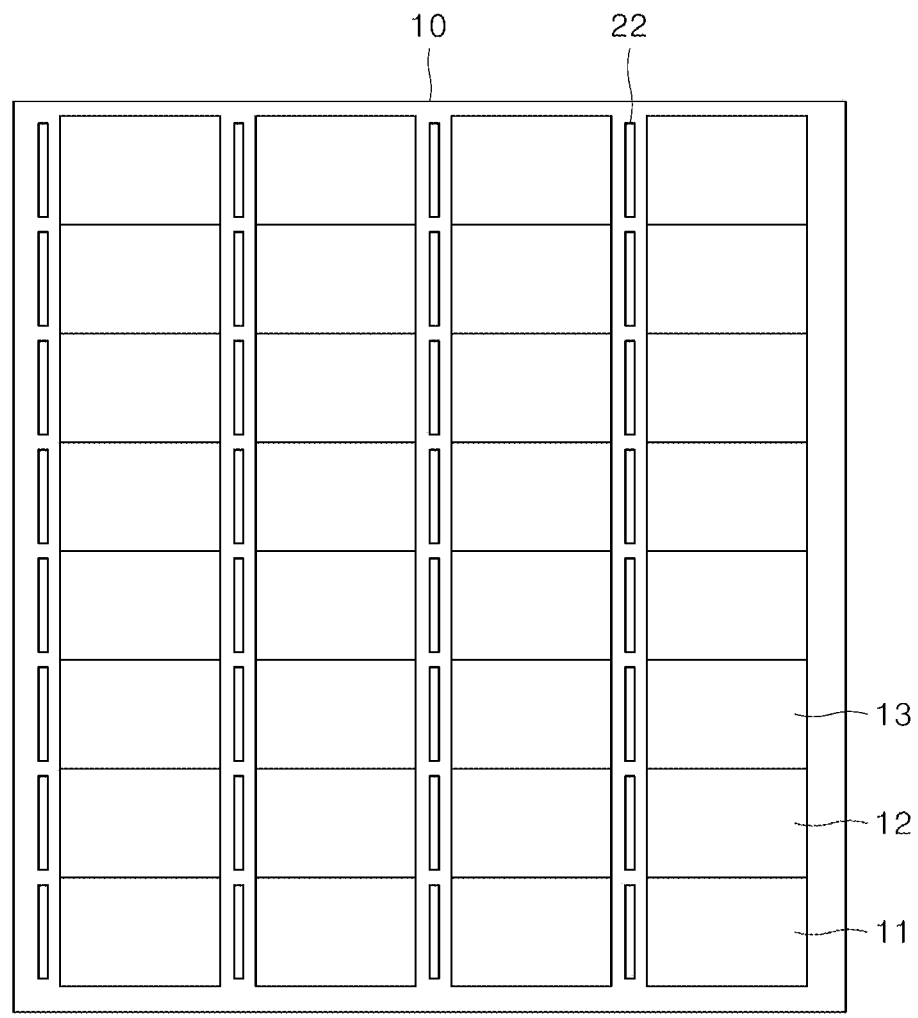
FIG. 1 shows a mother glass for manufacturing a display panel according to an aspect of the present disclosure.

Advantages and features of the present disclosure, and a method of achieving the advantages and features will become apparent with reference to aspects described later in detail together with the accompanying drawings. However, the present disclosure is not limited to aspects as disclosed below, but may be implemented in various different forms. Thus, these aspects are set forth only to make the present disclosure complete, and to completely inform the scope of the present disclosure to those of ordinary skill in the technical field to which the present disclosure belongs, and the present disclosure is only defined by the scope of the claims.

A shape, a size, a ratio, an angle, a number, etc. disclosed in the drawings for describing the aspects of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular aspects only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify an entirety of list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like may be disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In interpreting a numerical value, the value is interpreted as including an error range unless there is no separate explicit description thereof.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various aspects of the present disclosure may be partially or entirely combined with each other, and may be technically associated with each other or operate with each other. The aspects may be implemented independently of each other and may be implemented together in an association relationship.

In descriptions of temporal relationships, for example, temporal precedent relationships between two events such as "after", "subsequent to", "before", etc., another event may occur therebetween unless "directly after", "directly subsequent" or "directly before" is not indicated.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display panel according to some aspects of the present disclosure and a display device including the same will be described.

Figure 2:
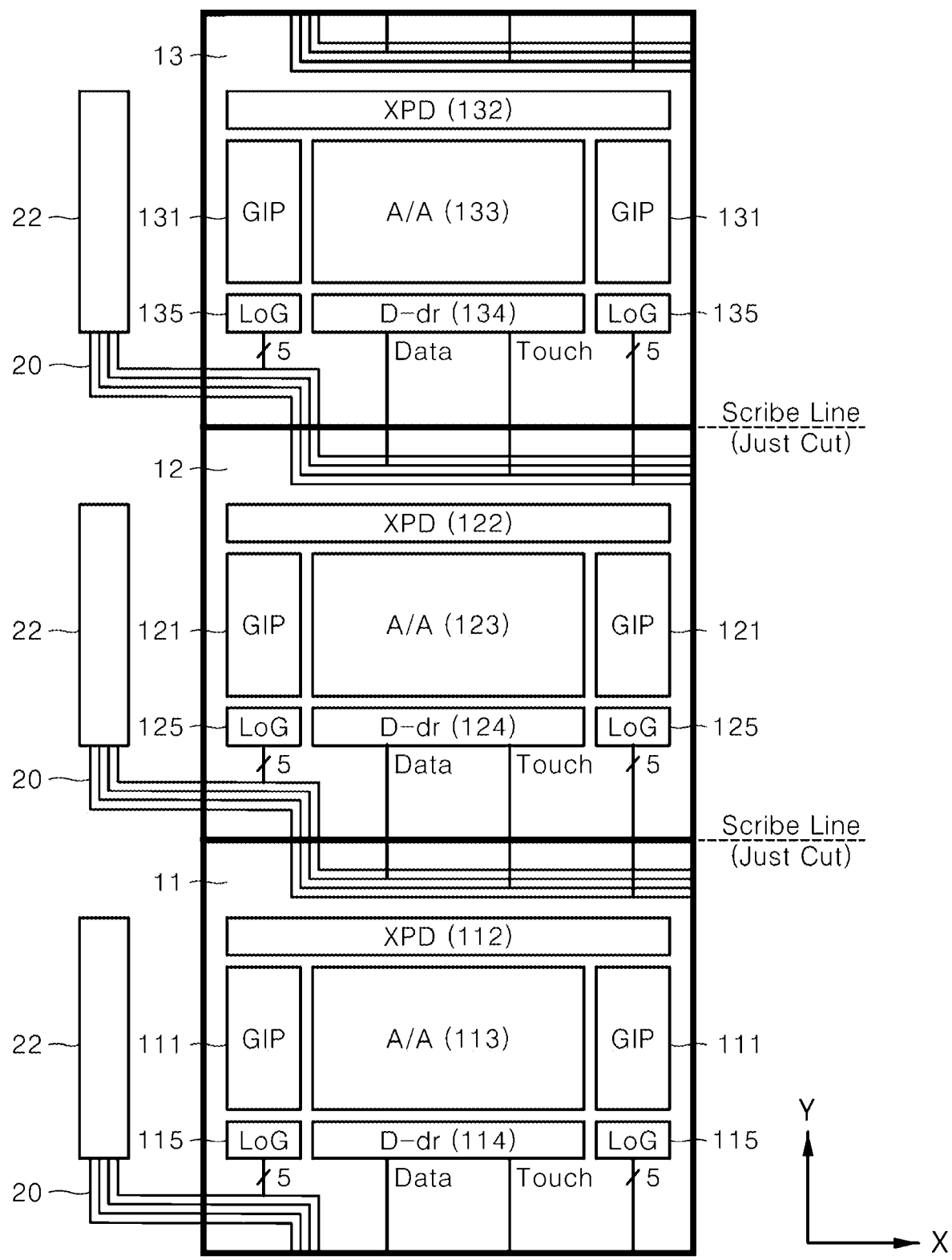
FIG. 2 is a diagram showing a detailed structure of each panel area in FIG. 1.
Figure 3:
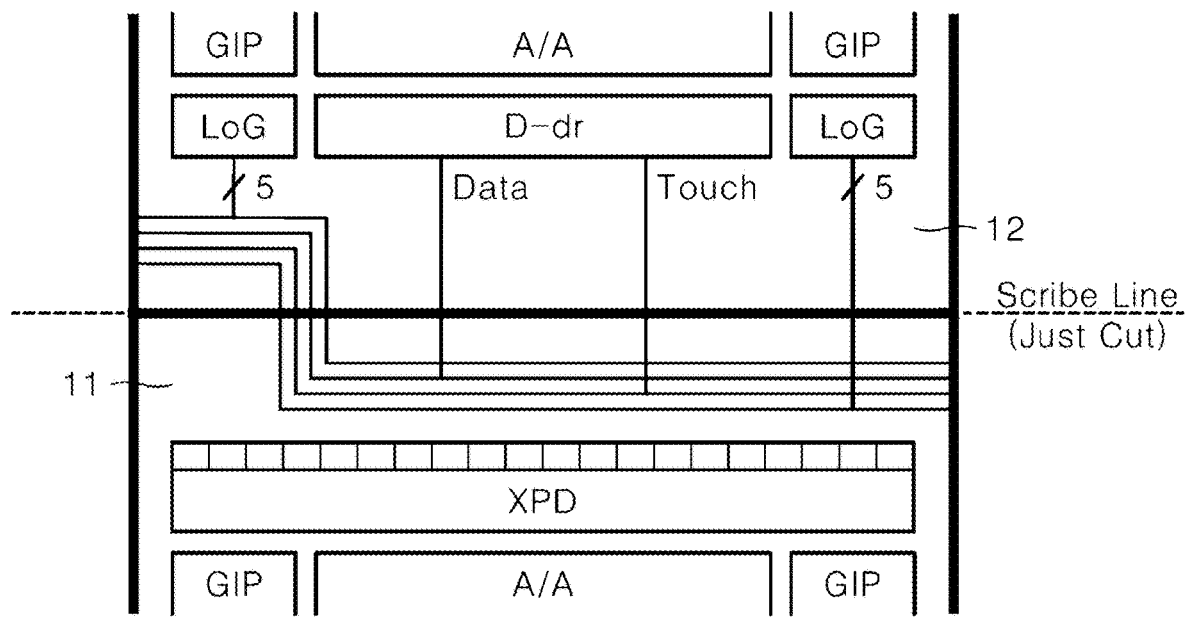
FIG. 3 is a diagram showing a scribe line for cutting between adjacent two panel areas of FIG. 1.
Figure 4:
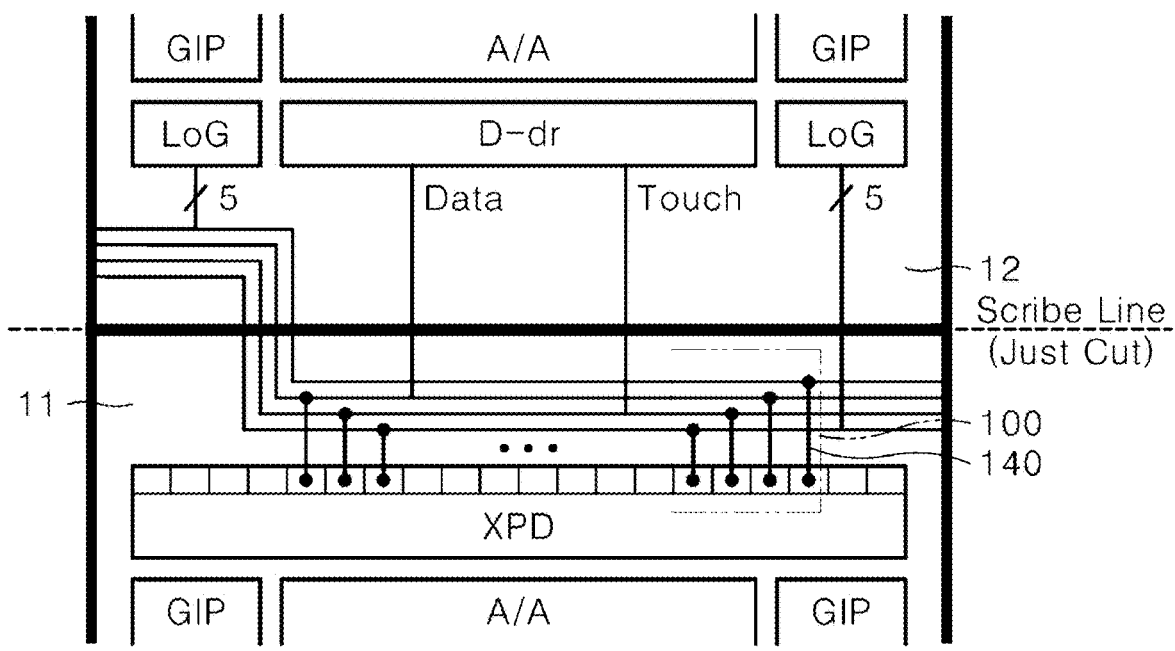
FIG. 4 is a diagram showing an example of a display panel obtained by just-cutting along the scribe line between the adjacent two panel areas of FIG. 3.

FIG. 1 shows a mother glass for manufacturing a display panel according to an aspect of the present disclosure. FIG. 2 is a diagram showing a detailed structure of each panel area in FIG. 1. FIG. 3 is a diagram showing a scribe line for cutting between adjacent two panel areas of FIG. 1. FIG. 4 is a diagram showing an example of a display panel obtained by just-cutting along the scribe line between the adjacent two panel areas of FIG. 3.

Referring to FIG. 1 to FIG. 4, the mother glass used for manufacturing a display panel according to an aspect of the present disclosure may be embodied as, for example, a parent panel 10 in which a plurality of panel areas 11, 12, and 13 are arranged and spaced from one another.

The parent panel 10 according to an aspect of the present disclosure may be configured such that one panel area has a size of 23.8 inches. Accordingly, 32 panel areas may be arranged in the parent panel 10. The 32 panel areas may be defined in the parent panel 10. However, the present disclosure is not limited thereto. The number of panel areas defined in the parent panel 10 may vary depending on a size of each panel area. As shown in FIG. 1, in the parent panel 10, for example, 4 panel areas may be defined in a transverse direction (i.e., X-axis direction) and 8 panel areas may be defined in a longitudinal direction (i.e., Y-axis direction).

In the parent panel 10, a space may be defined between adjacent panels in the transverse direction (X-axis direction). Each of a plurality of MPS pads 22 for an MPS inspection may be disposed in a space between two panel areas spaced apart from each other and adjacent to each other in the transverse direction (X-axis direction).

The parent panel 10 may include a first panel area 11, a second panel area 12 and a third panel area 13 adjacent to one another in the longitudinal direction (Y-axis direction).

In the parent panel 10, the panel areas may be arranged and adjacent to each other in the transverse direction (X-axis direction) or may be arranged and adjacent to each other in the longitudinal direction (Y-axis direction). The MPS lines 20 may be disposed in each panel area, and the MPS lines 20 may be connected to each MPS pad 22 disposed in the space between the panel areas.

A scribe line may be formed on the parent panel 10. The scribe line may be used to cut and separate the first panel area 11 and the second panel area 12 from each other.

In an aspect of the present disclosure, to obtain a panel, for example, a scribe process of irradiating laser light to and along the scribe line and just-cutting along the scribe line may be executed.

Therefore, after the scribe process, a first panel 11 corresponding to the first panel area 11 and the second panel 12 corresponding to the second panel area 12 may be obtained. Each MPS line 20 may remain on each of the cut panels 11 and 12.

In an aspect of the present disclosure, the first panel area 11 may be referred to as one of a first array substrate 11, a first display panel 11 and the first panel 11, while the second panel area 12 may be referred to as one of a second array substrate 12, a second display panel 12, and the second panel 12.

The first panel 11 and the second panel 12 may be obtained by just-cutting the parent panel 10 in the scribe process.

As described above, efficiency of glass may be increased by obtaining a plurality of panels from the parent panel 10.

For example, in the 23.8 inch model, 32 panels may be obtained from the parent panel 10.

In the scribe process, the just cut may be performed without a spacing between the panel areas to increase the efficiency of the glass and obtain the maximum number of UPS (unit per sheet). To produce as many panels as possible from the parent panel 10, the spacing between panel areas in the longitudinal direction (Y-axis direction) may be absent. Therefore, just cut may be executed in the scribe process. Referring to FIG. 1 and FIG. 2, the panels 11, 12, and 13 may be arranged in the parent panel 10 so that adjacent panel areas share at least one side with each other.

The MPS lines 20 for inspecting disconnection and short circuit defects of each signal line are formed between the first panel area 11 and the second panel area 12 adjacent to each other in the longitudinal direction (Y-axis direction) in the parent panel 10. The MPS lines 20 are connected to each MPS pad 22.

The MPS lines 20 extend in the longitudinal direction (Y-axis direction) from the MPS pad 22 out of the second panel area 12, and then are bent toward the transverse direction (X-axis direction) perpendicular to the longitudinal direction, and then extend into the second panel area 12 and then are bent toward the longitudinal direction (Y-axis direction) and then extend into the first panel area 11.

Then, the MPS lines 20 are bent toward the transverse direction (X-axis direction) and then extend in the transverse direction (X-axis direction) within the first panel area 11. Referring to FIG. 2, in an upper side area of the first panel area 11, the MPS lines 20 may be bent toward the transverse direction (X-axis direction), and then extend in the transverse direction (X-axis direction) to a right end.

Hereinafter, an aspect of the present disclosure will be described on the first panel 11 in which static electricity is induced due to the MPS lines 20.

As shown in FIG. 2, the first panel 11 may include a first GIP (Gate In Panel) 111, a first non-pad area (exception PAD) (hereinafter, XPD) 112, a first display area (active area) (hereinafter, A/A) 113, a first data driver (hereinafter, D-dr) 114 and a first line (Line on Glass) (hereinafter, LoG 115).

In the display panel, the GIP, the non-pad area XPD, the data driver D-dr and the line LoG may be disposed on a base substrate including the display area A/A and a non-display area N/A.

The first GIP 111 may apply a scan signal to the gate lines of the first display area 113. For example, the first GIP 111 may sequentially apply a gate voltage, on one horizontal line basis, to the pixels in response to reception of a gate control signal GCS of the timing controller T-con. The first GIP 111 may be implemented as a shift register having a plurality of stages sequentially outputting a high-level gate voltage every a first horizontal period. The timing controller T-con may control the first GIP 111 and the first data driver 114. For example, the timing controller T-con receives an image signal applied from an external device, a clock signal, and a timing signal such as vertical and horizontal synchronization signals, and generates the gate control signal GCS and a data control signal DCS based on the received signals and supplies the generated control signals to the first GIP 111 and the first data driver 114. In this regard, the horizontal sync signal indicates a time taken to display one line of a screen, and the vertical sync signal indicates a time taken to display one frame of the screen. Further, the control signal of the gate and each driver may be generated based on the clock signal. In addition, the timing controller T-con may be connected to an external system through a predefined interface and may receive image-related signals and timing signals outputted therefrom at high speed without noise. The interface may include an interface operating in an LVDS (Low Voltage Differential Signal) scheme or a TTL (Transistor-Transistor Logic) interface scheme.

In the first non-pad area 112, a plurality of lines such as a ground line, a common voltage line Vcom Line, and an ESD (Electrostatic Discharge) circuit may be disposed.

In the first display area 113, a plurality of gate lines may extend in a transverse direction, a plurality of data lines may extend in the longitudinal direction, and each of sub-pixels may be disposed at each of intersections between the plurality of gate lines and the plurality of data lines.

The first data driver 114 may apply the data signal to a plurality of data lines. The first data driver 114 may be attached to a data pad in a form of, for example, a driver chip (or driver-IC).

The first line 115 may include a first-first line 115 disposed on a left side of the data driver 114 and a first-second line 115 disposed on a right side of the data driver 114.

The first line 115 may be directed toward the first GIP 111. During TFT inspection, the first line 115 may transmit a MPS signal to the first GIP 111. Further, the first line 115 may include a line connecting the MPS pad 22 and the first GIP 111 to each other. In this case, the first line 115 may transmit the MPS signal from the MPS pad 22 to the first GIP 111.

Some of the MPS lines 20 may be connected to the first-first line 115, while another thereof may be connected to the first data driver 114, and still another thereof may be connected to the first-second line 115. One of the MPS lines connected to the first data driver 114 may be used for transmitting the data signal, and the other thereof may be used for transmitting a touch signal. The MPS line 20 connected to the first-first line 115 and the first-second line 115 is illustrate as a single line in FIG. 2. However, the number of the MPS lines 20 connected to the first-first line 115 and the first-second line 115 may be plural. Two or more lines may be connected to the first data driver 114.

In the same manner as in the first panel 11, the second panel 12 may include a second GIP 121, a second non-pad area 122, a second display area 123, a second data driver 124 and a second line 125.

Further, In the same manner as in the first panel 11, the third panel 13 may include a third GIP 131, a third non-pad area 132, a third display area 133, a third data driver 134 and a third line 135.

Each of the second GIP 121 and the third GIP 131 may have the same structure and the same function as those of the first GIP 111.

Each of the second non-pad area 122 and the third non-pad area 132 may have the same structure and the same function as those of the first non-pad area 112.

Each of the second display area 123 and the third display area 133 may have the same structure and the same function as those of the first display area 113.

Each of the second data driver 124 and the third data driver 134 may have the same structure and the same function as those of the first data driver 114.

Each of the second line 125 and the third line 135 may have the same structure and the same function as those of the first line 115.

Each of the first line 115, the second line 125, and the third line 135 may include a plurality of lines such as a ground line GND, clock signal lines CLK1 to CLK8, a reset line RESET, and a common voltage line Vcom. Further, each of the first line 115, the second line 125 and the third line 135 may include, in addition to the above-mentioned lines, a start voltage line Vst, a gate low voltage-related line VGL_UD, and VGL2, a gate high voltage-related line VGH_O, VGH_E, and VGH, etc.

As shown in FIG. 3, in an aspect of the present disclosure, the scribe process of irradiating laser light to and along the scribe line at a boundary of the first panel area 11 and the second panel area 12, and just-cutting the first panel area 11 and the second panel area 12 may be executed.

Therefore, after the scribe process, the first panel 11 and the second panel 12 may be obtained in a separate manner, and the cut MPS lines 20 as described above may remain on each of the panels 11 and 12.

As shown in FIG. 4, the first panel 11 according to an aspect of the present disclosure may include static electricity discharge part 100 for discharging static electricity induced by the MPS lines 20 remaining after the scribe process.

The static electricity discharge part 100 may have a structure in which the MPS lines 20 and ESD circuits are respectively connected to each other through discharge lines 140.

The first panel 11 according to an aspect of the present disclosure may be just cut from the parent panel 10 along the scribe line in the scribe process and may be one of the two panels 11 and 12 arranged in a vertical direction. For example, after the just cut, the first panel area 11 below the scribe line becomes the first panel 11, while the second panel area 12 above the scribe line becomes the second panel 12.

Accordingly, the MPS lines 20 remains in an upper area of the first panel 11 and a lower area of the second panel 12. In an upper area of each of the first panel 11 and the second panel 12, the MPS lines 20 extend in the longitudinal direction (Y-axis direction) from an upper end, and area bent into the transverse direction (X-axis direction), and then extend the transverse direction to the right end. In a lower area of each of the first panel 11 and the second panel 12, the MPS lines 20 extend in the transverse direction (X-axis direction) from a left end, and are bent toward the longitudinal direction (Y-axis direction) and extend in the longitudinal direction to a lower end.

In the first panel 11, when the static electricity is generated in the non-display area, the static electricity is induced due to the remaining MPS lines 20 and may be applied to the common voltage Vcom line through the ground line, resulting in voltage distortion. However, in the first panel 11 according to an aspect of the present disclosure, the static electricity induced due to the MPS lines 20 may flow to the ESD circuits through the static electricity discharge part 100, so that the voltage distortion does not occur. In an aspect of the present disclosure, during the just cut process, the first panel 11 and the second panel 12 share one side with each other in the longitudinal direction (Y-axis direction), and thus the MPS lines 20 remain in each of the first panel 11 and the second panel 12. Thus, the MPS lines 20 remaining in the first panel 11 may be connected to the ESD circuit of the first panel 11 through the discharge lines 140, thereby preventing the static electricity being applied to the common voltage Vcom line through the MPS lines 20.

In a model in which the panel areas are not arranged in a manner such that the just cut is applied but the panel areas are generally arranged, the MPS lines do not remain on the separated panels arranged in the vertical direction as achieved cutting along the scribe line. Dummy pixels may remain on the upper panel, or a key for a different purpose and an empty space may remain thereon. The GIP, the non-pad area, and the display area, etc. may remain on the lower panel. Functions of the GIP, the non-pad area, and display area are the same as those of the GIP, the non-pad area, and the display area as described above.

However, the first panel 11 and the second panel 12 according to an aspect of the present disclosure may be arranged in the manner to which the just cut is applied to obtain as many panels as possible from the parent panel 10. Thus, the MPS lines 20 remain on each of the first panel 11 and the second panel 12 after the scribe process.

Accordingly, when the static electricity is generated in the non-display area of the first panel 11, the static electricity is induced due to the MPS lines 20 remaining on the first panel 11. Thus, a structure to prevent the static electricity from affecting the display area A/A is required. Therefore, the remaining MPS lines 20 on the first panel 11 may be connected to the ESD circuit through the discharge lines 140, thereby removing the static electricity problem.

Figure 5:
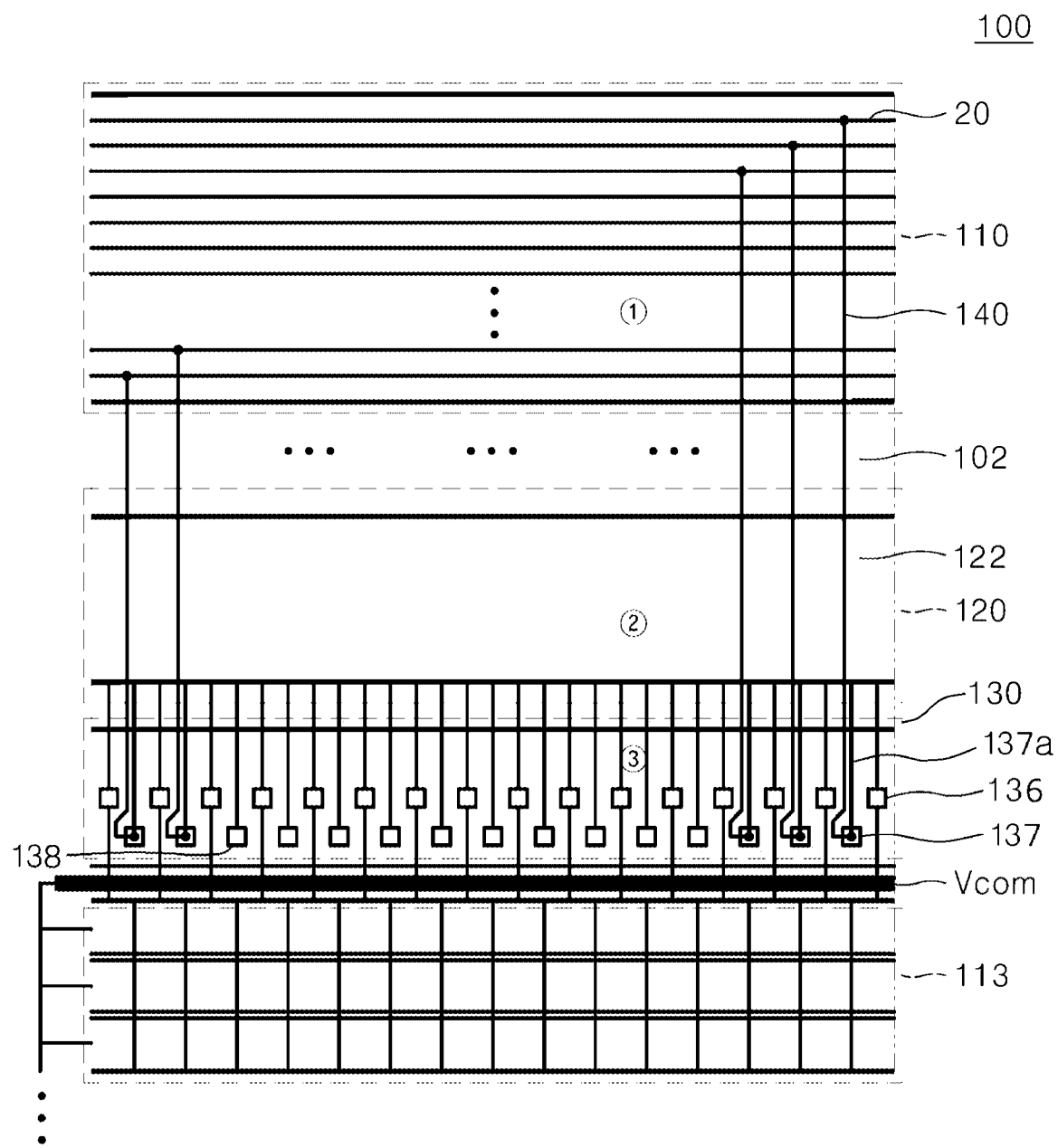
FIG. 5 shows a configuration of static electricity discharge part in a display panel according to an aspect of the present disclosure.

FIG. 5 shows a configuration of static electricity discharge part in a display panel according to an aspect of the present disclosure. FIG. 5 shows the static electricity discharge part 100 in FIG. 4 in more detail.

Referring to FIG. 5, the static electricity discharge part 100 according to an aspect of the present disclosure may include a MPS area 110, a ground area 120, an ESD area 130 and the discharge lines 140 on the base substrate 102.

In this regard, the base substrate 102 may include the display area A/A and the non-display area N/A.

The MPS area 110 may be disposed an upper area of the non-display area N/A. In addition, at least the MPS lines 20 may be disposed in the MPS area 110.

The ESD area 130 may be disposed between the MPS area 110 and the display area (A/A) 113. In addition, the ESD area 130 includes ESD (Electrostatic Discharge) circuits. Two or more ESD (Electrostatic Discharge) circuits in the ESD area may discharge the static electricity generated in the display area A/A and the non-display area N/A.

The discharge lines 140 may connect the MPS lines 20 and the ESD circuits to each other, respectively.

The discharge lines 140 may be made of the same material as that of the pixel electrode Pixel. For example, the discharge lines 140 may be made of an indium-tin-oxide (ITO).

The ground area 120 may be disposed between the MPS area 110 and the ESD area 130. In addition, a ground electrode 122 may be disposed in the ground area 120.

The ESD circuits may include at least one pixel ESD circuit 136 and at least one discharge ESD circuit 137.

The ESD area 130 may include at least one pixel ESD circuit 136, at least one discharge ESD circuit 137 and at least one redundant ESD circuit 138.

Each of the at least one pixel ESD circuit 136 may have one end connected to each pixel of the display area 113 and the other end connected to the ground electrode 122. Accordingly, the pixel ESD circuits 136 may discharge the static electricity generated or induced in the display area 113 to the ground electrode 122.

Each of the at least one discharge ESD circuit 137 may have one end connected to each of the discharge lines 140 and the other end connected to the ground electrode 122. Accordingly, the discharge ESD circuits 137 may discharge the static electricity introduced from the MPS line 20 through the discharge lines 140 to the ground electrode 122.

The at least redundant ESD circuit 138 may be used to maintain a constant spacing between the ESD circuits, or may be used redundantly. Further, the redundant ESD circuit 138 may be connected to the discharge line 140 or each pixel of the display area 113 when necessary.

The at least one discharge ESD circuit 137 may be connected to the ground electrode 122 through a ground connection line 137a.

The common voltage line Vcom may be disposed between the ESD area 130 and the display area 113. The common voltage line Vcom extends horizontally and may be connected to each pixel of the display area 113 at each of top and bottom sides of the display area 113. In this case, the common voltage line Vcom may be embodied as a gate line Gate.

Figure 6A:
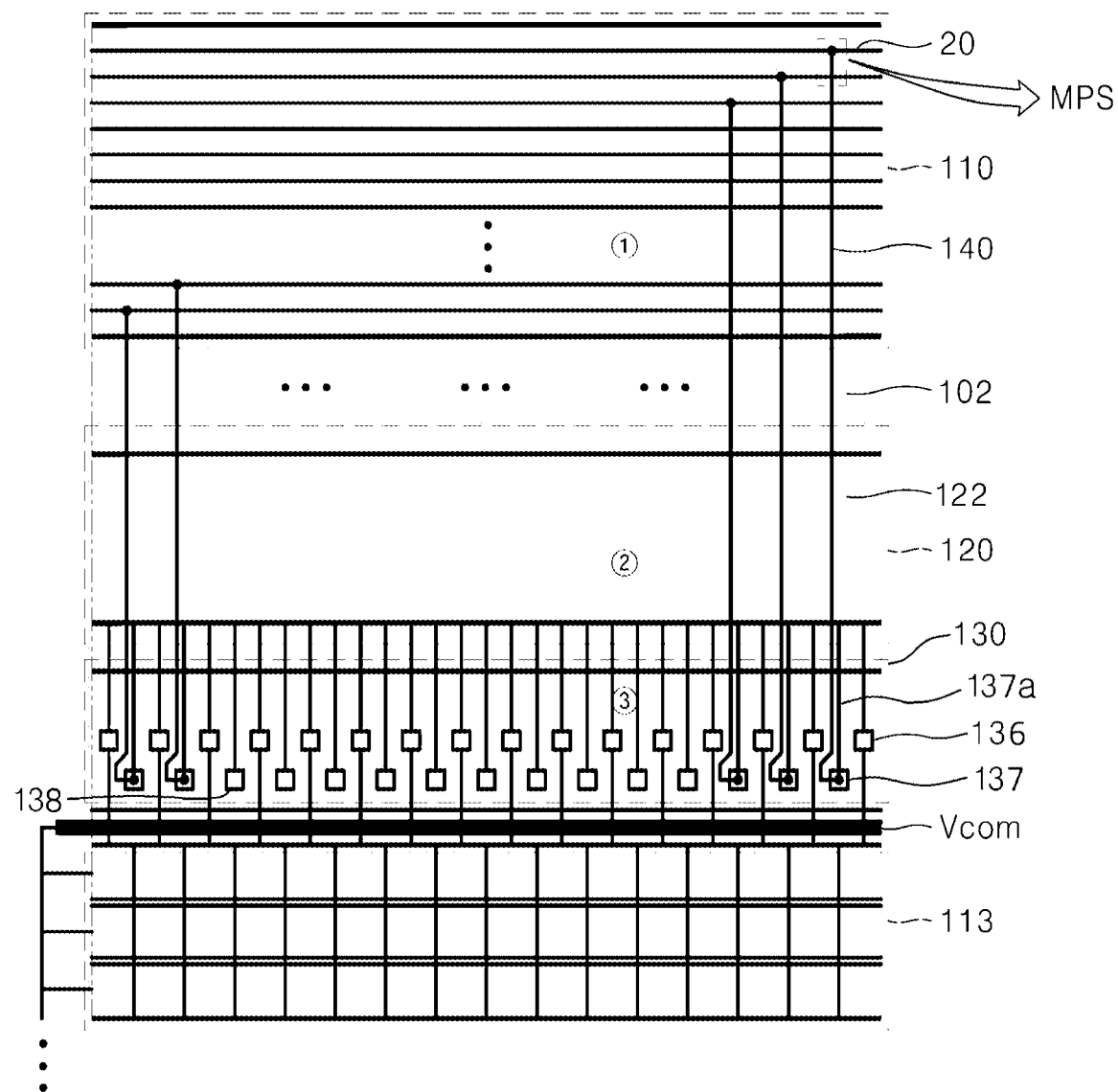
FIG. 6A is a diagram showing a connection area MPS between one discharge line and one MPS line in an MPS area of static electricity discharge part according to an aspect of the present disclosure.
Figure 6B:
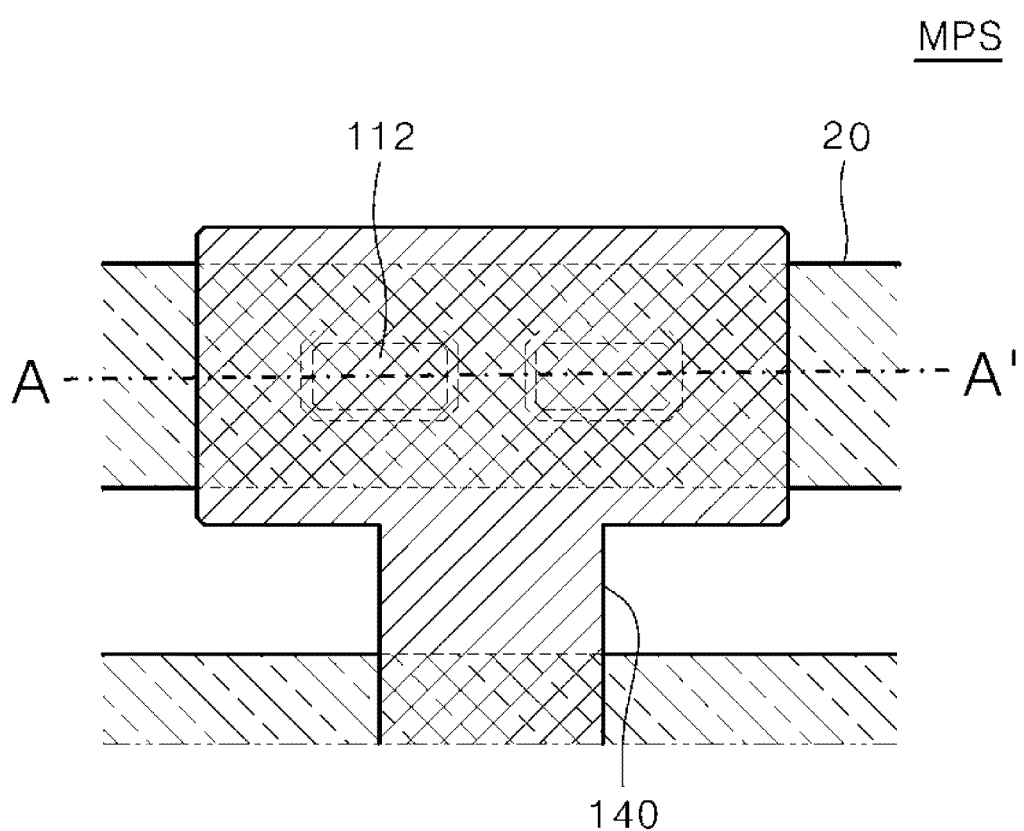
FIG. 6B is a diagram showing a plan view of a connection area MPS in a MPS area of static electricity discharge part according to an aspect of the present disclosure.
Figure 6C:
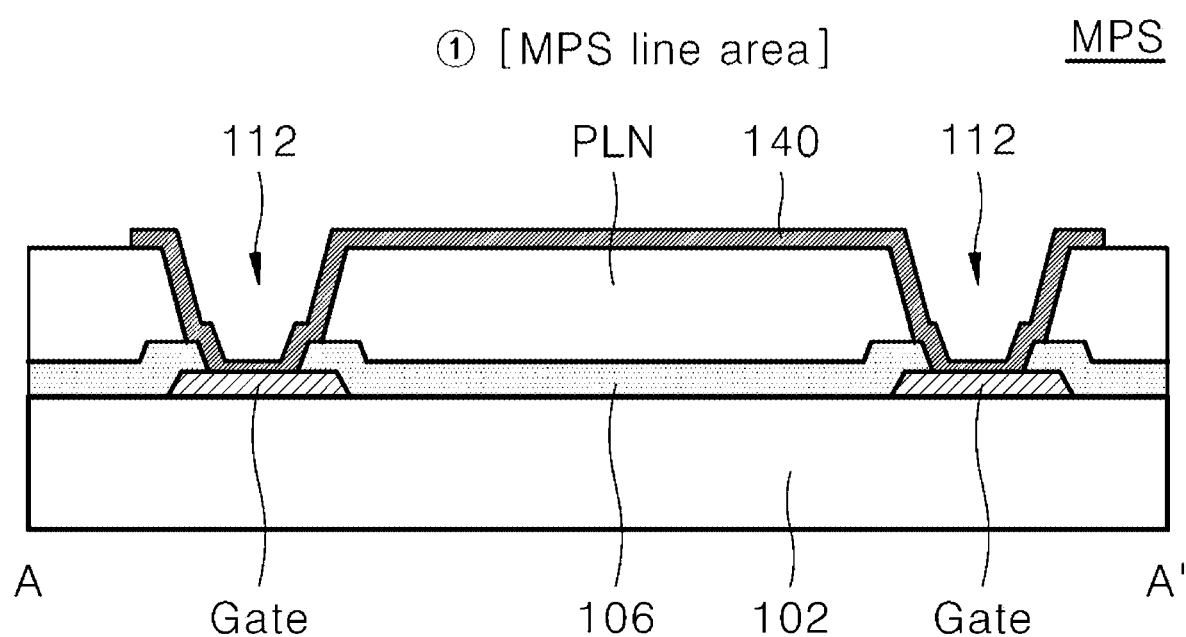
FIG. 6C is a diagram showing a cross-sectional view cut along line A-A' of a connection area MPS in a MPS area of static electricity discharge part according to an aspect of the present disclosure.

FIG. 6A is a diagram showing a connection area MPS between one discharge line 140 and one MPS line 20 in a MPS area of static electricity discharge part according to an aspect of the present disclosure. FIG. 6B is a diagram showing a plan view of a connection area MPS in a MPS area of static electricity discharge part according to an aspect of the present disclosure. FIG. 6C is a diagram showing a cross-sectional view cut along a line A-A' of a connection area MPS in a MPS area of static electricity discharge part according to an aspect of the present disclosure.

Referring to FIG. 6A to FIG. 6C, the connection area MPS in the MPS area 110 of the static electricity discharge part 100 according to an aspect of the present disclosure, one MPS line 20 extending in the transverse direction and one discharge line 140 extending in the longitudinal direction are connected to each other.

In the connection area MPS in the MPS area 110, one MPS line 20 is in electrical contact with one discharge line 140 via a first contact hole 112 as shown in FIG. 6B.

In the MPS area 110, at least one discharge line 140 may be respectively connected to at least MPS line 20 via the first contact hole 112.

One MPS line 20 may be made of the same material as a material of the plurality of gate lines and may be formed on the base substrate 102 in the same process as that of the gate lines. The plurality of gate lines may be made of the same material as a gate metal Gate.

At least MPS lines 20 in MPS area 110 may be made of the same material as the gate metal Gate and may be formed on the base substrate 102.

In the connection area MPS of the MPS area 110, as shown in FIG. 6C, the MPS line 20 on the base substrate 102 may be made of the same material as the gate metal Gate. Further, in the connection area MPS, a gate insulating layer 106 may be formed on the MPS line 20 made of the same material as the gate metal Gate, and a planarization layer PLN may be formed on the gate insulating layer 106. Further, in the connection area MPS, a first through-hole 112 extends through the planarization layer PLN and the gate insulating layer 106. The discharge lines 140 may be formed on the planarization layer PLN. Further, in the connection area MPS, the discharge line 140 may extend through the first through-hole 112 and may be connected to the MPS line 20 made of the same material as the gate metal Gate.

Figure 7B:
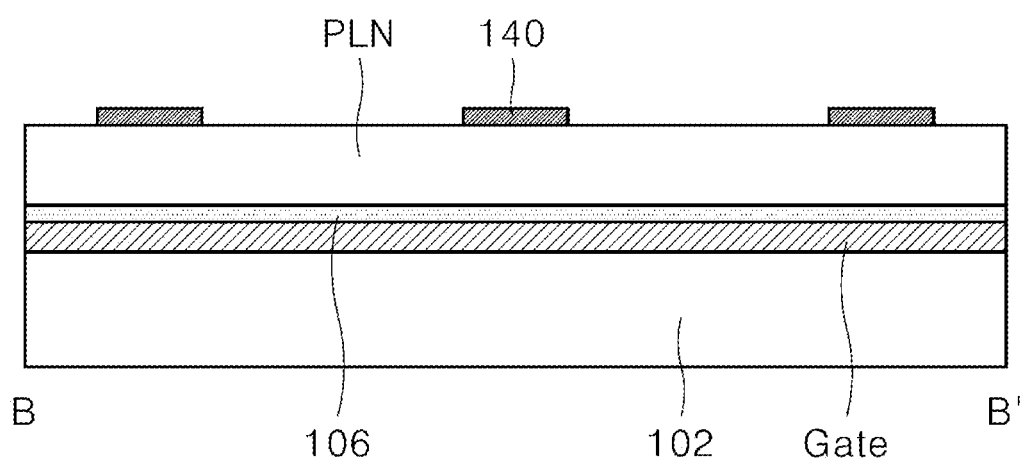
FIG. 7B is a view showing a cross-sectional view taken along a line B-B' in a ground area of a static electricity discharge part according to an aspect of the present disclosure.

FIG. 7A is a diagram showing a discharge line in a ground area of a static electricity discharge part according to an aspect of the present disclosure. FIG. 7B is a view showing a cross-sectional view taken along a line B-B' in a ground area of a static electricity discharge part according to an aspect of the present disclosure.

Referring to FIG. 7A, in the static electricity discharge part 100 according to an aspect of the present disclosure, in the ground area 120, at least one discharge line 140 may extend in the longitudinal direction while overlapping the ground electrode 122 extending in the transverse direction.

In this case, the ground electrode 122 and the at least one discharge line 140 may overlap each other while being electrically insulated from each other through an insulating layer. The insulating layer may be embodied as the planarization layer PLN.

Referring to FIG. 7B, in the static electricity discharge part 100 according to an aspect of the present disclosure, in the ground area 120, the ground electrode 122 made of the same material as the gate metal Gate may be disposed on the base substrate 102. The gate insulating layer 106 may be formed on the ground electrode 122 made of the same material as the gate metal Gate. Further, in the ground area 120, the planarization layer PLN may be formed on the gate insulating layer 106, and at least one discharge line 140 may be formed on the planarization layer PLN.

Figure 8A:
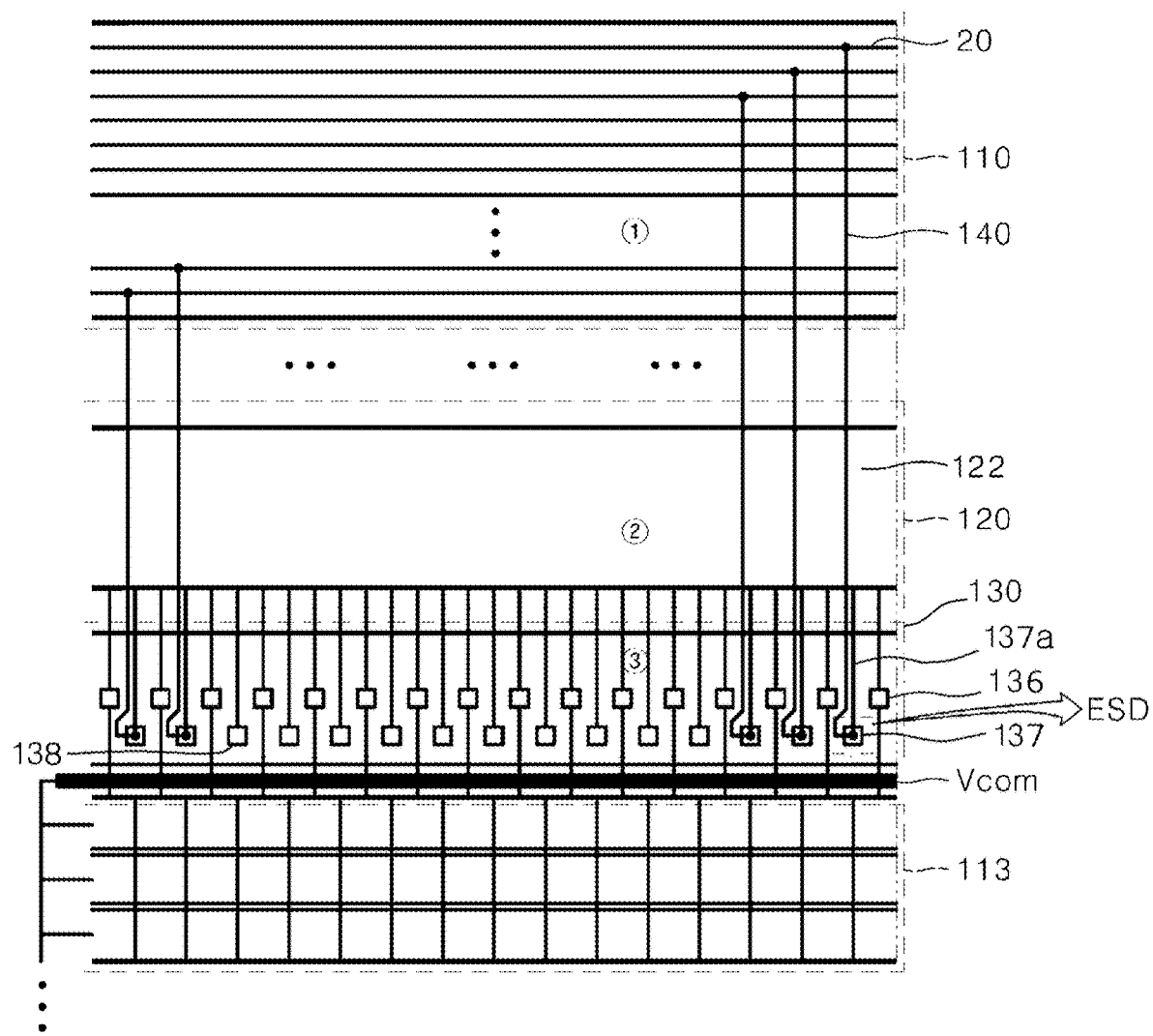
FIG. 8A is a diagram showing one discharge ESD circuit ESD in an ESD area of static electricity discharge part according to an aspect of the present disclosure.
Figure 8B:
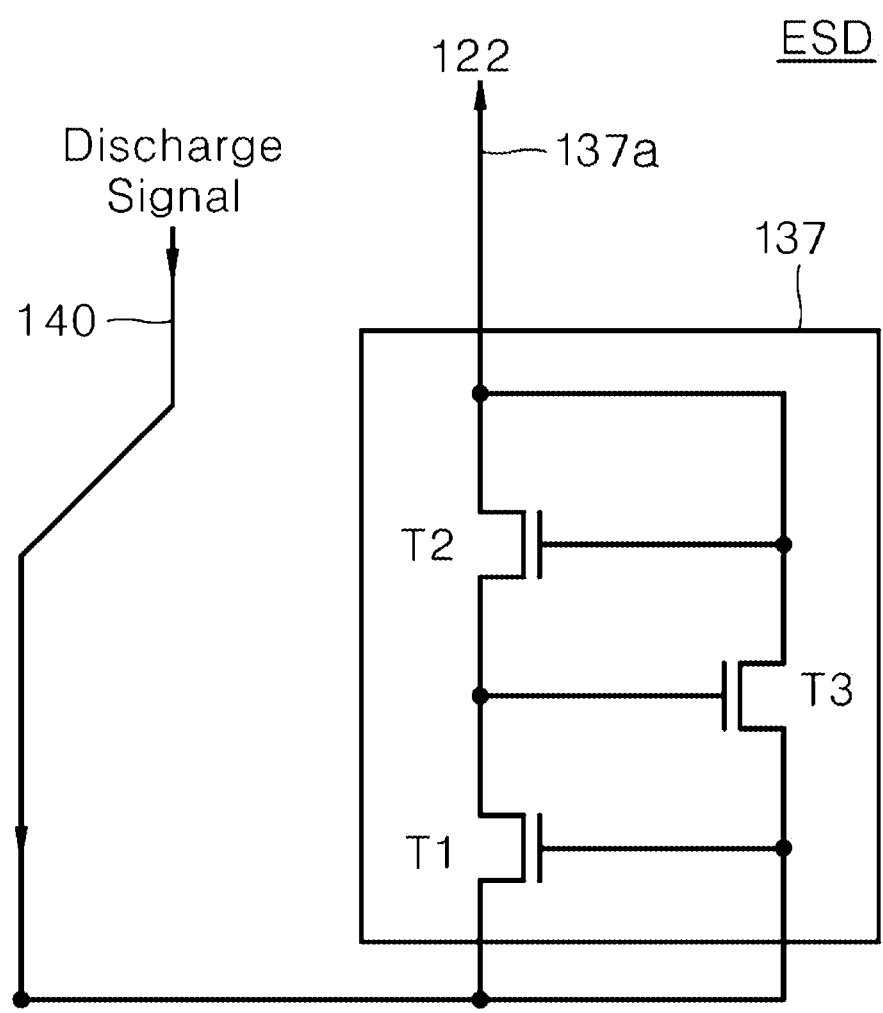
FIG. 8B is a diagram showing a circuit configuration example of one discharge ESD circuit ESD in an ESD area of static electricity discharge part according to an aspect of the present disclosure.

FIG. 8A is a diagram showing one discharge ESD circuit ESD in an ESD area of the static electricity discharge part according to an aspect of the present disclosure. FIG. 8B is a diagram showing a circuit configuration example of one discharge ESD circuit ESD in the ESD area of the static electricity discharge part according to an aspect of the present disclosure.

Referring to FIG. 8A, the ESD area 130 according to an aspect of the present disclosure may include at least one pixel ESD circuit 136 and at least one discharge ESD circuit 137.

At least discharge ESD circuit 137 may be respectively connected to at least one discharge line 140.

The MPS lines 20 may be made of the same material as the gate metal Gate and may be formed in the same process as the gate metal Gate. The discharge line 140 may be made of the same material as that of the pixel electrode formed in the display area 113. The discharge lines 140 may be made of a transparent conductive material. The discharge lines 140 may be made of a combination of metal and oxide or metal oxide.

One discharge ESD circuit 137 may have one end connected to the discharge line 140 and the other end connected to the ground electrode 122 through the ground connection line 137A.

Referring to FIG. 8B, one discharge ESD circuit 137 in the ESD area 130 according to an aspect of the present disclosure may include at least one thin-film transistor T1, T2, and T3.

Each of at least one thin-film transistor T1, T2, and T3 may have one end connected to the discharge line 140 in a connection area and the other end connected to the ground connection line 137a in the connection area.

A first electrode of the first thin-film transistor T1 may be connected to the discharge line 140 and a first electrode of the third thin-film transistor T3. A second electrode of the first thin-film transistor T1 may be connected to the first electrode of the third thin-film transistor T3. A third electrode of the first thin-film transistor T1 may be connected to a first electrode of the second thin-film transistor T2 and a second electrode of the third thin-film transistor T3.

A second electrode of the second thin-film transistor T2 may be connected to a third electrode of the third thin-film transistor T3, and a third electrode of the second thin-film transistor T2 may be connected to a second electrode of the second thin-film transistor T2 and a third electrode of the third thin-film transistor T3.

In this case, the third electrode of the second thin-film transistor T2 may be connected to the ground electrode 122 through the ground connection line 137a.

One discharge line 140 may be made of a transparent conductive material, for example, indium-tin-oxide (ITO). However, the disclosure is not limited thereto.

Figure 9:
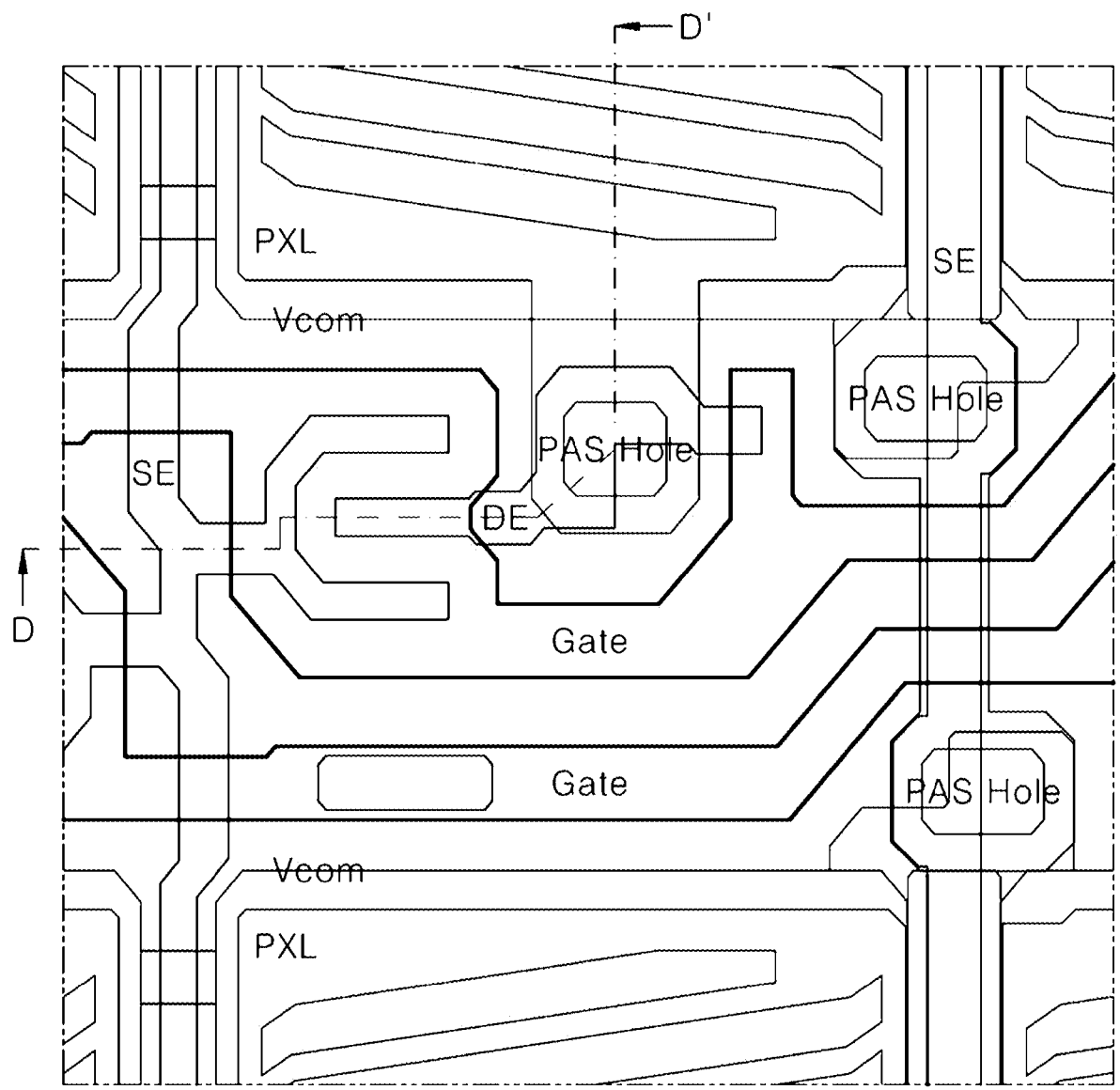
FIG. 9 is a diagram showing a line structure for one pixel in a display area according to an aspect of the present disclosure.
Figure 10:
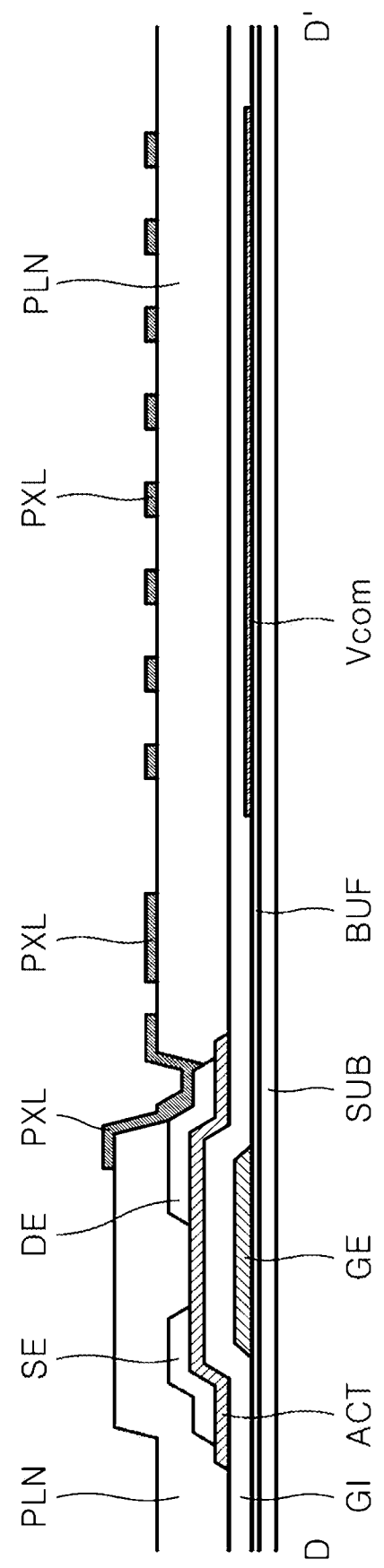
FIG. 10 is a cross-sectional view taken along line D-D' in a line structure of FIG. 9.

FIG. 9 is a diagram showing a line structure for one pixel in a display area according to an aspect of the present disclosure, and FIG. 10 is a diagram showing a cross-sectional view taken along a line D-D' in the line structure of FIG. 9.

Referring to FIG. 9, in one pixel, a source electrode SE of a thin-film transistor and a drain electrode DE thereof may be spaced apart from each other by a predetermined spacing. Further, the drain electrode DE may be connected to a pixel electrode PXL via a contact hole PAS Hole. The pixel electrode PXL may be made of a transparent metal material. For example, the pixel electrode PXL may be made of an indium-tin-oxide (ITO). However, the present disclosure is not limited thereto. The pixel electrode may be made of a metal such as copper (Cu), aluminum (Al), titanium (Ti), tantalum (Ta), and molybdenum (Mo), or an alloy thereof.

Further, the gate electrode Gate may be disposed to overlap the source electrode SE and the drain electrode DE of the thin-film transistor. In addition, the gate electrode Gate may be formed to protrude from the gate line Gate.

Further, the common voltage line Vcom may be disposed, and the pixel electrode PXL may be disposed to overlap the common voltage line Vcom.

Referring to FIG. 10, one pixel may include a channel area and an array area. A buffer layer BUF may be disposed on the base substrate SUB, and a gate electrode GE and a common voltage electrode Vcom may be disposed on the buffer layer. The gate electrode GE may be disposed in the channel area, and the common voltage electrode Vcom may be disposed in the array area.

Further, in one pixel, a gate insulating layer GI may be disposed on the gate electrode GE and the common voltage electrode Vcom, and an active layer ACT may be disposed on the gate insulating layer GI. A source electrode SE and a drain electrode DE may be disposed on the active layer ACT. The source electrode SE and the drain electrode DE may be disposed on the active layer ACT and may be spaced apart from each other by a predetermined spacing.

Further, in one pixel, a planarization layer PLN may be disposed on the source electrode SE, the drain electrode DE, and the active layer ACT, and a pixel electrode PXL may be disposed on the planarization layer.

In this case, in the channel area, a contact hole PAS hole may extend through a portion of the planarization layer disposed on the drain electrode DE. The pixel electrode PXL may be connected to the drain electrode DE via the contact hole.

Accordingly, when the pixel electrode PXL is formed on the planarization layer in one pixel, at least one discharge line 140 of the static electricity discharge part 100 of the non-display area N/A may be made of the same material as the pixel electrode PXL.

As described above, according to the present disclosure, even when the static electricity is introduced into the display panel due to the MPS lines remaining on the display panel, the static electricity from the MPS lines may flow into the ESD circuit through the discharge lines. Thus, the voltage distortion caused by the MPS lines may be prevented. Thus, the static electricity related defect is prevented.

In the above-described aspect, the disclosure has been applied to the LCD display device. However, the disclosure is not limited thereto, and the disclosure may be applied to an OLED display device.

As described above, according to the present disclosure, the display panel in which the panel defects caused by static electricity induced by the inspection line remaining on the panel after the cutting process of mother glass during the manufacturing process of the display device may be suppressed, and the display device including the same may be provided.

A scope of protection of the present disclosure should be construed by the scope of the claims, and all technical ideas within the scope equivalent thereto should be construed as being included in the scope of the present disclosure. Although the aspects of the present disclosure have been described in more detail with reference to the accompanying drawings, the present disclosure is not necessarily limited to these aspects. The present disclosure may be implemented in various modified manners within the scope not departing from the technical idea of the present disclosure. Accordingly, the aspects disclosed in the present disclosure are not intended to limit the technical idea of the present disclosure, but to describe the present disclosure. the scope of the technical idea of the present disclosure is not limited by the aspects. Therefore, it should be understood that the aspects as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A display device comprising:
   a display panel obtained by just-cutting a parent panel having a plurality of panel areas arranged adjacent to one another in a scribe process,
   wherein the display panel includes:
   a base substrate including a display area and a non-display area disposed outside of the display area, and a pixel defined in each of intersections between a plurality of gate lines and a plurality of data lines in the display area;
   a multi-pattern search (MPS) area disposed in an upper area of the non-display area, wherein at least one MPS line is disposed in the MPS area;
   an electrostatic discharge (ESD) area in which at least one ESD circuit is disposed, wherein the at least one ESD circuit discharges static electricity generated in the display area and the non-display area;
   a ground area between the MPS area and the ESD area, wherein a ground electrode is disposed in the ground area;
   a static electricity discharge part including at least one discharge line for connecting the at least one MPS line to the at least one ESD circuit, wherein the at least one discharge line overlaps the ground electrode in the ground area; and
   a gate in panel (GIP) for supplying a scan signal to the plurality of gate lines; and a data driver for supplying a data signal to the plurality of data lines.

2. The display panel of claim 1, wherein the at least one discharge line is connected at one end to the at least one MPS line, extends through the ground area to overlap the ground electrode, and is connected at another end to the at least one ESD circuit.

3. The display panel of claim 1, wherein the at least one ESD circuit comprises at least one discharge ESD circuit connected at one end to the at least one discharge line and connected at another end to the ground electrode.

4. The display panel of claim 1, wherein the at least one ESD circuit comprises at least one thin-film transistor connected at one end to the at least one discharge line and connected at another end to the ground electrode.

5. A display panel comprising:
   a display area configured to display images;
   a non-display area disposed outside the display area;
   a multi-pattern search MPS area including a plurality of MPS lines configured to check disconnection and short circuit of each signal line of a thin-film transistor array in the display area;
   an electrostatic discharge ESD area including a plurality of discharging ESD circuits configured to discharge static electricity generated in the display area and the non-display area and a plurality of redundant ESD circuits configured to maintain a constant spacing among the plurality of discharging ESD circuits;
   a ground area including a ground electrode disposed between the MPS area and the ESD area, and connected to the plurality of discharging ESD circuits through a ground connection line; and
   a plurality of discharge lines electrically connecting the plurality of MPS lines and the plurality of ESD circuits and connected to the ground electrode.

6. The display panel of claim 5, wherein the ESD area further includes a plurality of pixel ESD circuit connected to each pixel of the display area and the ground electrode.

7. The display panel of claim 5, further comprising a common voltage line disposed between the ESD area and the display area and connected with each pixel of the display area.

8. The display panel of claim 5, wherein the plurality of discharge lines are formed of a transparent conductive material.

9. The display panel of claim 5, wherein the plurality of discharge lines are connected at one end to the plurality of MPS lines, extend through the ground area to overlap the ground electrode, and are connected at another end to the plurality of discharging ESD circuits.

10. The display panel of claim 5, wherein the plurality of redundant ESD circuits are configured to be connectable to the plurality of discharge lines.

* * * * *